(No Model.)
F. L. BOUILLOTTE.
SUGAR CANE UNLOADER.
No. 556,456. Patented Mar. 17, 1896.
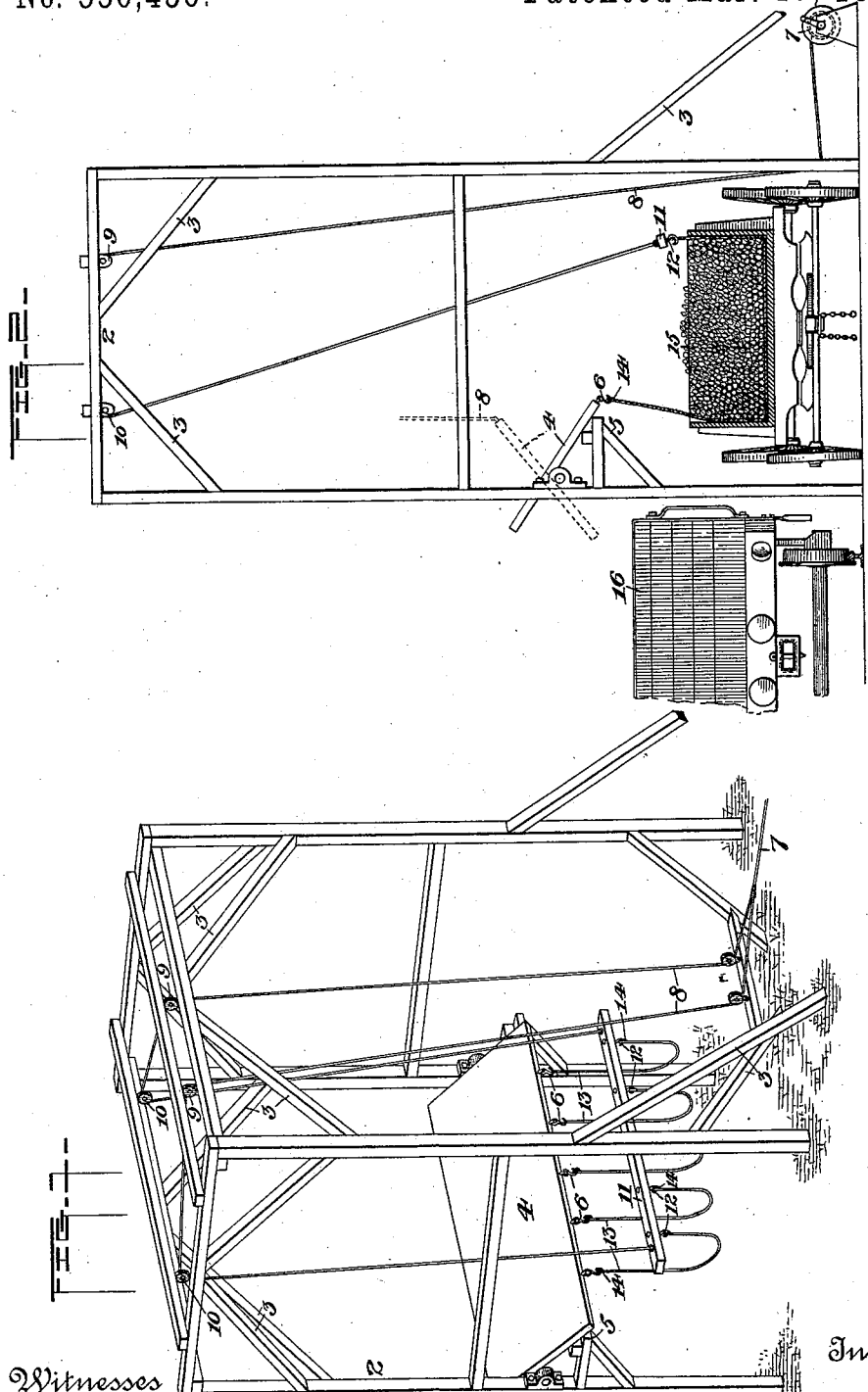
Witnesses
Inventor
Francis L. Bouillotte
By ___ Attorney

United States Patent Office.

FRANCIOS L. BOUILLOTTE, OF ALEXANDRIA, LOUISIANA.

SUGAR-CANE UNLOADER.

SPECIFICATION forming part of Letters Patent No. 556,456, dated March 17, 1896.

Application filed April 15, 1895. Serial No. 545,782. (No model.)

*To all whom it may concern:*

Be it known that I, FRANCIOS L. BOUILLOTTE, a citizen of the United States, residing at Alexandria, in the parish of Rapides and State of Louisiana, have invented certain new and useful Improvements in Sugar-Cane Unloaders, of which the following is a specification, reference being had therein to the accompanying drawings.

My invention relates to a device for loading and unloading sugar-cane in bulk and other bulky material in bundle or baled form, but is primarily designed for unloading the first above named by handling a load all at one time.

As is well known, sugar-cane after it is stripped and cut is loaded upon tram-cars or wagons in the field and is very unwieldy, being from five to nine feet long, and is heavy and bulky, so that it has not been practicable to handle it in bulk. When said cane is to be shipped by rail or boat, it requires the rehandling of each individual piece of cane to transfer it from the tram-car or wagon to said railroad-car or boat, thus adding to the cost of shipment and entailing much labor. To lessen the cost of handling, and at the same time facilitate the transfer from the wagon or tram-car to the common carrier by a simple, strong and effective, means is the object of this invention.

My invention further consists in certain features of construction and combination of parts, as will more fully hereinafter appear, and be pointed out in the claims.

In the accompanying drawings, Figure 1 is a perspective view of the apparatus. Fig. 2 is a cross-sectional view of the same, showing the wagon and car.

In the drawings, similar figures of reference indicate like parts wherever they occur.

The frame 2 of the apparatus is constructed of wood or other suitable material and is provided with suitable braces 3, arranged so as to impart the necessary strength to the structure. Pivoted to one side of the frame is a tilting platform 4, the trunnions of which are located so that more of the weight of said platform is upon side toward the inside of the frame and normally rests upon the supporting-brackets 5, secured to the uprights of the frame 2. Along the edge of the platform is arranged a series of hooks 6, or other securing devices, so placed that they shall be a suitable distance apart and co-operate with slings and other hoisting mechanism hereinafter described.

The hoisting mechanism consists of a suitable windlass operated by any source of power most conveniently obtainable. Around the windlass is wound a rope or chain 7, which passes around a pulley or tackle-block and at a desired point is divided into strands or ropes 8, which pass upwardly and over two sheaves or tackle-blocks 9 and 10, secured to supporting-beams at the top of the main frame 2. After passing around these pulleys 9 and 10 the ropes pass downwardly to a bar or beam 11, which is provided with hooks or securing devices 12, which are arranged at suitable distances apart upon the bar and co-operate with the hooks 6 upon tilting platform 4. The sling-ropes 13 are formed with suitable eyes 14, at each end, and said sling-ropes are laid crosswise in the bottom of the box or rack of the wagon or tram-car 15, and the eyes 14 are placed over suitable projections or hooks therein before the cane is loaded, and the cane or bale is placed thereon.

The vehicle 15 is driven in under the frame 2, and when in the proper position the sling-ropes are attached by the eyes 14 to the hooks 6 and 12 on the tilting platform 4 and bar or beam 11. The car 16, upon which it is desired to load the contents of the vehicle, is placed in the proper position, and when so placed power is applied to the ropes 7 and 8 and the load is lifted bodily, the sling supporting it, and as the bar 11 continues to ascend the tilting table is brought into a position which inclines downwardly toward the car 16, so that the load slides into the car as the sling 13 straightens under the continued ascent of the hoisting-ropes 7 and 8.

The tilting platform is arranged at a convenient height from the ground to accommodate different sizes of cars.

It is evident that, if desired, the whole apparatus can be made portable.

From the foregoing description the operation and utility will be obvious to those familiar with the handling of sugar-cane and baled or bundled materials.

Having thus fully described my invention, what I claim as new, and desire to secure by Letters Patent, is—

1. An apparatus for hoisting, comprising a frame, a platform hinged to said frame, said platform being provided with securing devices, sling-ropes adapted to pass beneath a load, a beam also provided with securing devices, the ends of the sling-ropes being attached to the securing devices on the platform and the beam, in combination with suitable hoisting mechanism whereby the load is lifted and deposited on the platform, and which by the continued ascent tilts said platform so as to discharge the load into a suitable receptacle for same, substantially as described.

2. An apparatus for hoisting cane and the like, comprising a frame, a platform trunnioned in suitable bearings and a beam, said platform being hung off the center, so that it, said platform, tilts inwardly, hooks secured to the inner edge of the platform, sling-ropes adapted to pass beneath and support the load, said sling-ropes being provided with eyes at their ends, the eyes in the sling-ropes fitting over the hooks on said beam and platform, in combination with hoisting mechanism attached to said beam, whereby the load is lifted, and deposited first upon the platform and then discharged into the desired receptacle for same, substantially as described.

In testimony whereof I affix my signature in presence of two witnesses.

FRANCIOS L. BOUILLOTTE.

Witnesses:
   E. B. SEGALAS,
   J. H. BRISTE.